United States Patent Office 2,817,685
Patented Dec. 24, 1957

2,817,685
PROCESS FOR THE PRODUCTION OF ORGANIC SULPHUR COMPOUNDS

Heinrich Hopff, Kusnacht, Switzerland, assignor to J. R. Geigy A.-G., Basel, Switzerland, a Swiss firm No Drawing. Application October 31, 1955
Serial No. 544,044

Claims priority, application Switzerland
November 4, 1954

1 Claim. (Cl. 260—609)

It is known the aromatic hydrocarbons react with sulphur in the presence of anhydrous aluminium chloride to form cyclic sulphur compounds. In this way thianthrene is obtained from benzene and sulphur and dimethyl thianthrene from toluene and sulphur.

It has now been found that also the many aliphatic and hydroaromatic hydrocarbons which are slow to react such as propane, butane, pentane, hexane etc. up to the highest members as well as cyclohexane, methyl cyclohexane, cyclopentane etc. as well as mixtures thereof such as are found in natural earth oils or in fuel synthesis react well with sulphur in the presence of Friedel-Crafts catalysts such as anhydrous aluminium chloride, bromide or iodide, boron fluoride, gallium chloride, iron chloride etc. In contrast to the behaviour of the aromatic hydrocarbons, the corresponding mercaptans of sulphides are obtained, according to the following equations:

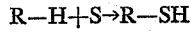
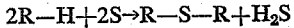

R—H+S→R—SH

2R—H+2S→R—S—R+H₂S wherein R represents the radical of an aliphatic or hydroaromatic hydrocarbon.

The reaction is performed by stirring the hydrocarbon, advantageously in excess, with about the equivalent amounts of sulphur, this advantageously in its monoclinic form, and with condensation agents at usual or raised temperature until the reaction is complete. With gaseous hydrocarbons such as propane, butane etc. it is of advantage to perform the reaction in a closed vessel under pressure. The reaction can be accelerated by the presence of hydrogen halides such as hydrogen chloride or hydrogen bromide.

The reaction mixture is worked up in the usual way: it is decomposed with ice, hydrochloric acid is added to decompose the condensing agent and the reaction product is isolated by decanting, shaking out with ether or steam distillation. The mercaptans formed can then be isolated in a pure form by shaking out with diluted lye and reprecipitating from the stratified lye with acids. The sulphides which are insoluble in alkalies can be obtained in pure form by distillation, advantageously in the vacuum.

The sulphur compounds obtained according to this process can be used as regulators in polymerisations, as intermediate products for the production of textile auxiliary products and dye-stuffs, as plant protection agents and for other purposes.

Example 1

250 parts of n-pentane, 32 parts of flowers of sulphur and 132 parts of anhydrous aluminium chloride are heated in an autoclave for 15 hours at 60° C. under a pressure of 10 atm. hydrogen chloride. The aluminum chloride is completely converted into a liquid molecule compound upon which unchanged pentane floats. The two layers are separated, the brown molecule compound is decomposed with ice with the addition of hydrochloric acid, shaken out with ether and the ethereal layer is extracted with diluted caustic soda lye. The pentane thiole formed can be almost quantitatively separated from the aqueous layer obtained by acidification with hydrochloric acid. It boils at 114–116°.

The part of the reaction product which is insoluble in alkali consists mainly of diamyl sulphide which boils at 180–182°. The total yield of reaction products containing sulphur is 85–90%.

Example 2

250 parts of cyclohexane are saturated with gaseous hydrogen chloride and, after the addition of 132 parts of anhydrous aluminium chloride and 32 parts of monoclinic sulphur, stirred for 24 hours at 50–60° whereupon the aluminum chloride is gradually converted into a brown liquid. After separating the unchanged cyclohexane, the brown molecule compound is worked up as described in Example 1. The corresponding mercaptan is obtained; probably 1-methyl-cyclopentane-thiole-2 and the corresponding sulphide are obtained in about the same amounts; total yield 80–85%.

Example 3

250 parts of petrol (B. P. 150–250°) which does not contain olefin are stirred at 30–40° for 24 hours as described in Example 1 with 267 parts of anhydrous aluminium bromide and 32 parts of sulphur in the presence of hydrogen bromide. The mixture is worked up as described in Example 1. A mixture of high boiling mercaptans and sulphides is obtained, some of which become solid after some time.

What I claim is:

The method for the production of organic sulphur compounds which comprises heating a saturated hydrocarbon selected from the group consisting of aliphatic and alicyclic saturated hydrocarbons with a Friedel-Crafts catalyst and monoclinic sulphur in the presence of a hydrogen halide selected from the group consisting of hydrogen chloride and hydrogen bromide to temperatures of 50° C. to 150° C.

References Cited in the file of this patent

FOREIGN PATENTS 365,169   Germany _____ Dec. 8, 1922

OTHER REFERENCES

Thomas: Anhydrous Aluminum Chloride in Organic Chemistry, A. C. S. Monograph Series No. 87, pages 830–833 (1941); Reinhold Pub. Corp., New York, N. Y.